Jan. 5, 1926.
G. A. BUTTRESS ET AL
1,568,314
COMPOSITION BOARD
Filed May 27, 1924
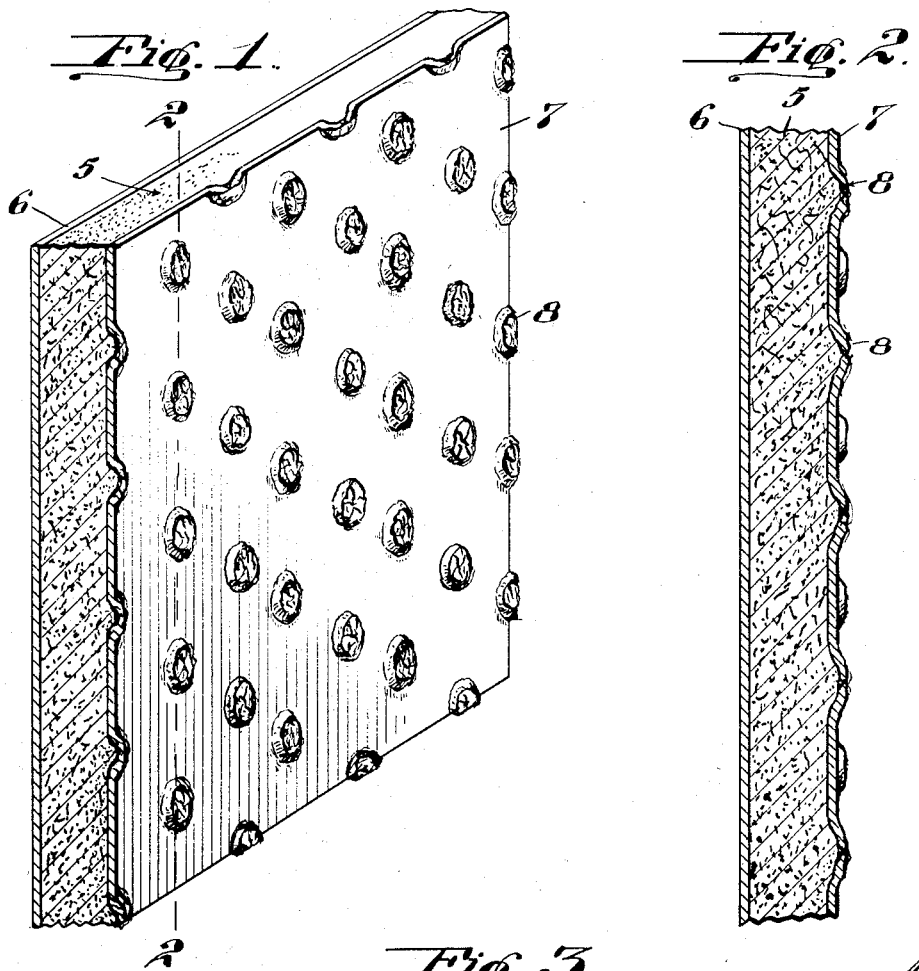
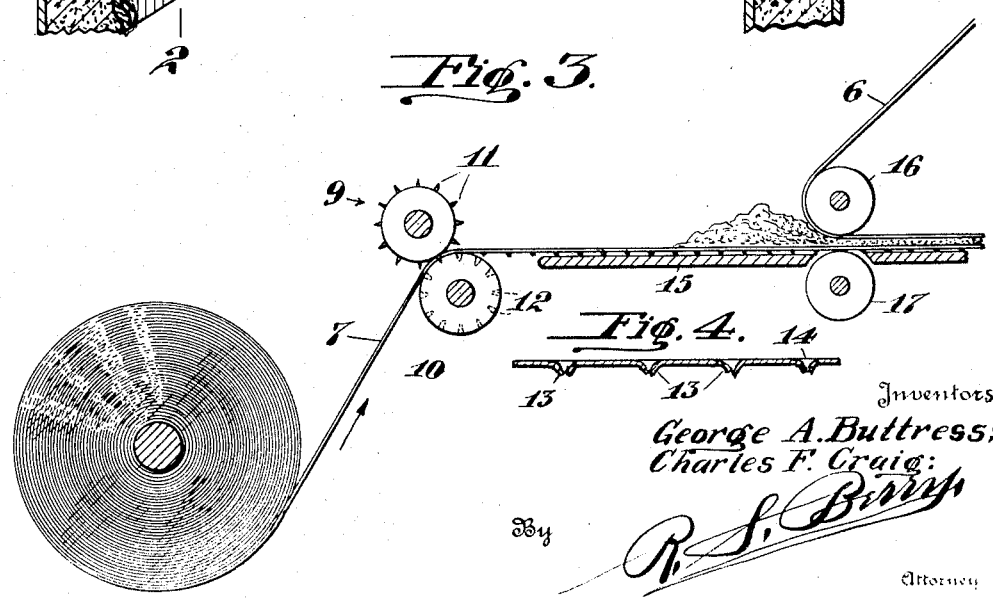
Inventors
George A. Buttress;
Charles F. Craig;
By Patented Jan. 5, 1926.

1,568,314

UNITED STATES PATENT OFFICE.

GEORGE A. BUTTRESS AND CHARLES F. CRAIG, OF LOS ANGELES, CALIFORNIA, ASSIGNORS TO REX GOODCELL, OF LOS ANGELES, CALIFORNIA.

COMPOSITION BOARD.

Application filed May 27, 1924. Serial No. 716,083.

*To all whom it may concern:*

Be it known that we, GEORGE A. BUTTRESS and CHARLES F. CRAIG, citizens of the United States, residing at Los Angeles, in the county of Los Angeles and State of California, have invented new and useful Improvements in Composition Board, of which the following is a specification.

Our invention particularly pertains to a composition board of the type employed in surfacing the walls and ceilings of buildings and especially relates to the class of composition wall boards which comprise a body or panel of plastic material interposed between and adhered to facing sheets of paper or similar fibrous material.

It is the purpose of our invention to provide a wall board of the above character which is adapted to be used as a backing for plaster and to this end our invention contemplates forming the board with a roughened surface to which plaster will readily adhere, and the invention primarily resides in studding the plaster-receiving surface of the board with numerous small protuberances which are formed on the plastic body and are covered with the facing sheet.

Heretofore composition boards have been produced having a surface so formed as to afford a key for plaster coatings, as by forming the board with slots or depressions to receive portions of the plaster coating, or by forming the board with corrugations or with protruding knobs or buttons composed of plastic material, and in some cases the board is formed with openings in the facing sheet to expose portions of the plastic body. It has been found in practice that on forming the board with openings impairs its strength and renders it difficult to handle in large sheets, and forming the board with apertures in the facing sheets also reduces its strength. Forming the board with protuberances has ordinarily been found objectionable in that the surface projections are either readily broken off in handling the board or are softened on the application of wet plaster thereto, so that they subsequently disintegrate. Forming the board with openings in its facing sheet to expose areas of the plastic necessities coating the exposed area with waterproof substance in order to prevent moisture in the fresh plaster from penetrating the plastic body of the board thereby causing it to swell and buckle. Furthermore, such boards have proven objectionable as the exposed areas of plastic or apertures in the board, or plastic protuberances thereon, cause such action on the plaster coating applied to the board that when the coating dries, the location of the spaces or protuberances may be discerned by reason of the difference in color of the portions of the plaster covering the openings or protuberances.

It is an object of our invention to so form the protuberances on the plaster-receiving surface of the board, as not to weaken the board and not expose any appreciable areas of the plastic body, and a further object is to so form the roughened surface of the board that it will have a substantially uniform absorptive character throughout and thereby obviate variation in color of the finished plaster coating.

Another object is to provide the board with a surface studded with projections that are so formed as not to be readily broken off and which will not interfere with stacking sheets in superimposed relation.

Another object is to so form the plaster-receiving surface of the board that plaster may be readily applied thereto and its adhesion to the surface of the board insured, so that the plaster will not roll under the trowel when being applied.

With the foregoing objects in view, together with such other objects and advantages as may subsequently appear, our invention resides in the parts, and in the construction, combination and arrangement of parts hereinafter described and claimed, and illustrated by way of example in the accompanying drawings, in which—

Figure 1 is a perspective view showing a fragmentary portion of a composition board constructed in accordance with this invention.

Figure 2 is a view in section as seen on the line 2—2 of Figure 1.

Figure 3 is a diagram illustrating a method of making the board in accordance with the invention.

Figure 4 is a detail in section of the facing sheet, showing the manner in which it is punctured to form its outer surface with protuberances.

Referring to the drawings more specifically, 5 indicates a plastic body or panel which is composed of any suitable materials such as gypsum mixed with sawdust or any other suitable binder. This plastic body is covered on its opposite sides with facing sheets 6 and 7, respectively, formed of paper or similar fibrous material which is caused to adhere to the plastic body 5 in the course of manufacture of the board, as is common in wall board construction.

The essence of the present invention resides in forming the surface of the board with protuberances 8 whereby it is studded with small knobs or projections throughout its surface thereby rendering it of such rough character that a coating of plaster will readily adhere thereto.

In forming the board, the method illustrated in Figure 3 is preferably employed, which consists in passing the facing sheet 7 between a pair of perforating rollers 9 and 10 which rollers are adapted to puncture the facing sheet and form small apertures therein as shown in Figure 4; the roller 9 being provided with peripheral pins or projections 11 which are adapted to extend into sockets or depressions 12 formed in the periphery of the roller 10 and act as the facing sheet 7 passes between the rollers to puncture the sheet at close intervals without removing the materials at the punctures thereby forming the margins of the punctures with downwardly extending tongues 13 and forming the upper surface of the sheet 7 with numerous spaced recesses or depressions 14 as shown in Figure 4. The sheet 7 thus formed is passed over a table 15 and between a pair of rollers 16 and 17 as is common in composition board construction; the facing sheet 6 being fed around the roller 16 and the plastic composition being fed between the sheets 6 and 7 as they pass between the rollers 16 and 17 in the usual manner. The plastic, while in a wet unstable condition is applied to the top of the facing sheet 7 before it passes between the rollers 16 and 17 as shown in Figure 3, and as the materials pass between the rollers the plastic is crowded into the recesses 14 in the facing sheet 7, and the tongues or frayed portions of the facing sheet 7, at the margins of the depressions 14, are pressed inwardly so as to substantially close the perforations and practically cover the portions of the plastic that enter the depressions 14 while the plastic is wet.

By punching the tongues 13 from the sheet the material thereof is stretched and the fibers ruptured and loosened so that the tongues will have such mass and area that when the sheet is passed between the rollers and thereby pressed on the plastic, the tongues and the bulging body of the plastic covered thereby will not be pressed flush with the facing sheet. The punctures are arranged so close together that when they are filled with the plastic and are rolled the pressure on the raised portions will be transmitted to the intervening portions of the sheet which will cause the entire inner surface of the sheet to be pressed tight against the plastic body and thereby effect adhesion of the facing sheet to the plastic body throughout.

In puncturing the sheet the aperture thus formed is extremely small so that the plastic will not pass therethrough in any appreciable quantity, in fact the facing sheet may not be perforated but may merely be punched or indented to form the desired depression on one side and the consequent bulges on the other.

In practice the protuberances are preferably formed about one-eighth or three-sixteenths of an inch in diameter and are spaced apart throughout the surface of the board approximately one-half of an inch, and will project from the surface of the board approximately one-thirty-second of an inch. The board will thus be formed with a surface that is studded with closely arranged protuberances which by reason of being covered with portions of the facing sheet will be protected against being broken off. These protuberances are irregular in contour by reason of the portions of the facing sheet extending thereover having been torn and rendered ragged by puncturing the sheet and by being pressed against the body of plaster extending into the recesses on the back of the sheet thus affording a roughened surface to which plaster will readily adhere.

The protuberances thus formed comprise small, substantially convex or dome-shaped projections formed of the plastic composition and extending beyond the plane of the outer surface of the facing sheet, with the plastic projections covered substantially throughout by raised portions of the facing sheet, thus forming a board with a surface having protuberances which extends outwardly from the main surface of the board.

The facing sheets 6 and 7 with the interposed plastic body 5 is conveyed in any suitable manner from between the rollers 16 and 17 and is subsequently cut in suitable lengths and dried, as is common in plaster board manufacture.

It is obvious that while the punched or punctured facing sheet is shown as passed between rollers as the lowermost facing sheet, it may be applied uppermost, that is, the plastic may be delivered to a smooth facing sheet and the indented sheet may be laid on the plastic.

We claim—

1. A composition wall board comprising a facing sheet having a multiplicity of laterally and longitudinally spaced recesses formed on the inner side thereof, the walls of which form protuberances on the outer side of said sheet, a plastic body to which the facing sheet is applied with its inner recessed face adhered to the plastic body with portions of the plastic body extending into the recesses thereof.

2. In a composition wall board, a facing sheet having a multiplicity of small punctures forming small apertures having portions of the materials of the sheet projecting from the margins of the apertures to one side of the sheet, a plastic body applied to the surface of the sheet on the side thereof opposite the projecting portions, said plastic body having protuberances extending into the apertures in the sheet, said projecting portions of the sheet overlying the plastic protuberances and substantially covering same, whereby the outer surface of said facing sheet is roughened.

3. The method of forming a composition wall board, consisting in puncturing a facing sheet to form a multiplicity of minute apertures therein having frayed marginal portions projecting from one side of the sheet, applying a coating of plastic material to the surface of the facing sheet opposite the frayed projecting portions, and causing portions of the plastic material to extend into the apertures, and pressing the frayed projecting portions of the facing sheet over the plastic in the apertures.

GEORGE A. BUTTRESS.
CHARLES F. CRAIG.